Sept. 27, 1955  A. G. BOWER  2,718,975
STEREO MOUNTING MACHINE
Filed April 23, 1954  6 Sheets-Sheet 1

Fig. 1

ATWOOD G. BOWER
INVENTOR.

BY

ATTORNEYS

Sept. 27, 1955      A. G. BOWER      2,718,975
STEREO MOUNTING MACHINE Filed April 23, 1954      6 Sheets-Sheet 2

ATWOOD G. BOWER
INVENTOR.

ATTORNEYS

Sept. 27, 1955     A. G. BOWER     2,718,975
STEREO MOUNTING MACHINE
Filed April 23, 1954                                          6 Sheets—Sheet 3

Fig. 4

ATWOOD G. BOWER
INVENTOR.

BY

ATTORNEYS

United States Patent Office 2,718,975
Patented Sept. 27, 1955

2,718,975
STEREO MOUNTING MACHINE

Atwood G. Bower, Rochester, N. Y., assignor to Eastman Kodak Company, Rochester, N. Y., a corporation of New Jersey Application April 23, 1954, Serial No. 425,294

17 Claims. (Cl. 216—21)

The present invention relates to a film mounting apparatus, and more particularly to a machine for severing pairs of stereo images from a film strip, and mounting the individual images of each pair in a mount in proper aligned and stereo relation.

Figure 10:
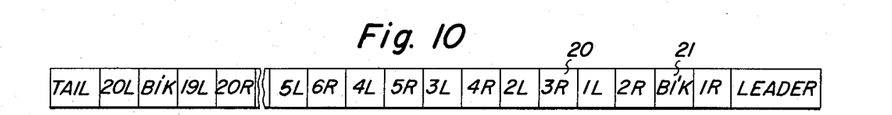
Fig. 10 is a view of the film strip showing the arrangement of the pairs of stereo images thereon.

As is well known, stereo transparencies are formed by making simultaneously a pair of exposures with a double lens camera in which the two lenses are separated the normal interocular distance. Due to the spacing of the camera lenses, the two images forming a stereo pair are not adjacent, but are spaced along the film strip, as shown in Fig. 10, and later to be more fully described. The various separate film strips usually are spliced together, maintaining perforation alignment, and processed in the well known manner. After processing, the connected or spliced strips are wound into a large roll from which the individual image areas are separated or severed, and are then mounted in proper spaced relation in a mount, usually cardboard. Now, when this mount is placed in a suitable viewer and the two images are viewed simultaneously, the eyes of the observer superimpose the image of one transparency over the other thus producing a stereo or three-dimension effect.

Prior to the present invention the severing and mounting of the pairs of stereo images was done more or less manually. Such a procedure was not only costly, but was otherwise undesirable. In order to overcome these difficulties, the present invention provides a machine in which individual image areas are successively severed from the film strip and each pair of stereo images is properly positioned on the mount and in aligned spaced stereo relation, the advnatages of which are deemed apparent. To secure this result, an individual image area, after being severed from the strip, is tacked in place on a suitable apertured mount. However, due to the spacing of the individual image areas of a pair of stereo images along the film strip, after one area has been severed and tacked, other intermediate areas of other pairs must first be severed and tacked to similar mounts. Then, the second area of the original pair is then severed and tacked to the mount and cooperates with a previously tacked area to provide the proper stereo pair on the mount.

To secure the proper mounting of the various pairs of stereo images on the proper mounts, the present invention provides a special form of platen, carriage or support, on which a pair of stereo mounts is positioned in accurate relation to and in alignment with the film strip. This platen is then moved in a straight line relation and in alignment with the film strip and in a definite sequence, so that each successive image area is severed from the film strip and is tacked on the proper mount and in the proper relation therewith.

The present invention has as its principal object, the provision of a machine for mounting pairs of stereo images severed from a film strip.

Another object of the invention is the provision of an arrangement in which the severing and tacking of an image area on the mount is performed concomitantly to insure proper positioning of the severed image area on the mount.

A further object of the invention is the provision of a novel form of platen and moving means therefor to insure the mounting of the various image areas on the proper mount and in proper relation thereon.

And another object of the invention is the provision of a platen which moves in straight line relation during the mounting operation.

Yet another object of the invention is the provision of means which effectively prevents improper movement or sequence of the movable platen in one direction. It is possible, however, to move the platen too far in sequence direction. But a still further object of the invention is the provision of a movable platen arrangement which is easy to operate, even by semi-skilled operators, simple in structure and highly effective in use.

To these and other ends the invention resides in certain improvements and combinations of parts all as will be hereinafter more fully described, the novel features being pointed out in the claims at the end of the specification.

In the drawings.

Similar reference numerals throughout the various views indicate the same parts.

As mentioned above, before processing the film strips are spliced together to form a long web which is wound into a roll. After processing the web is edge-coated with a vinyl heat seal application before it is mounted in the machine of the present invention. This coating allows the film to be tacked in place on the cardboard mount, as will be later more fully described.

As seen in Fig. 10, film strip 20 is provided with spaced pairs of stereo images, the corresponding images of each pair being designated by the same numerals, and the right and left hand images of a pair are further designated by the letters R and L. Thus, the right hand image of the third pair is designated by 3R while the left hand image of the same pair is designated by 3L. Because of the type of camera employed in making such a group of stereo images, a blank or unexposed area 21 is positioned between 1R and 2R. As such film strips are well known and form no part of the present invention, further details are not deemed necessary.

Figure 4:
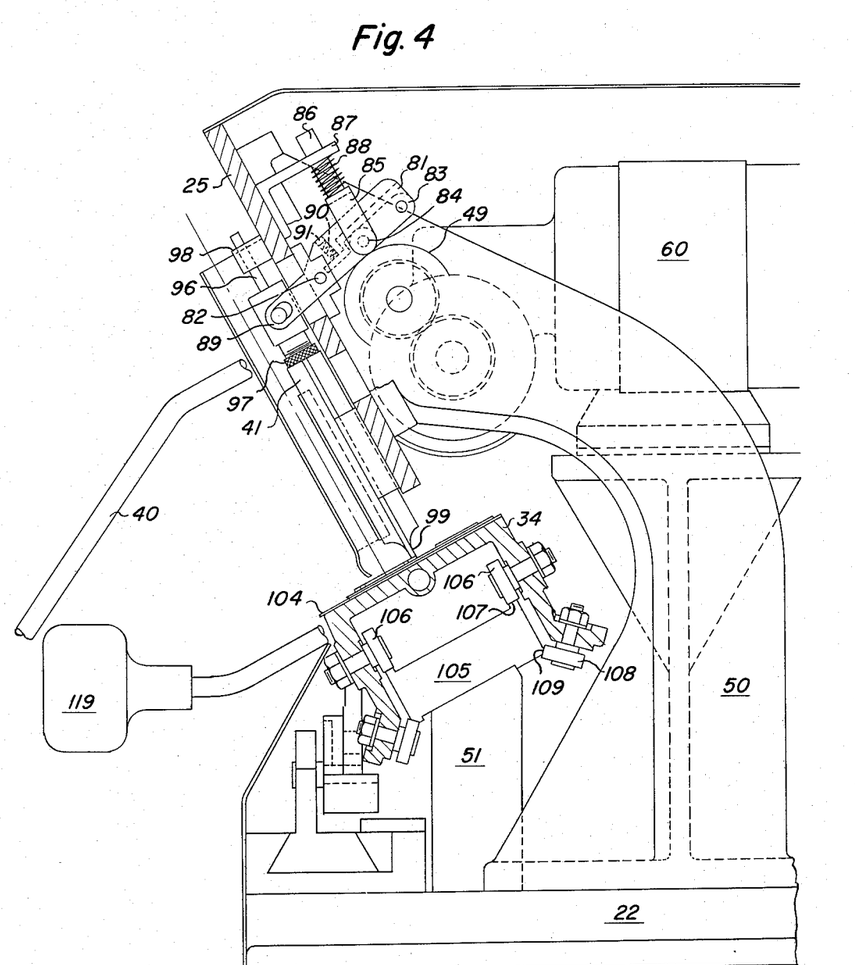
Fig. 4 is a vertical sectional view taken substantially on line 4—4 of Fig. 1, but on a larger scale than the latter, and showing the relation of the tacker and the movable mounts supporting platen.

The machine comprises a base plate 22 having upwardly extending cast iron brackets 50, see Fig. 4, which support a face plate or wall 25 in elevated position above the base plate 22. The plate 25 has mounted thereon film tracks 23 along which the film strip is moved, as will be later more fully described. A platen 24 is supported and moved on a stationary track 105 which is also supported on the base plate by means of a bracket 51, Fig. 4. The stereo film strip 20 is wound into a roll 26 which is rotatably supported on a bracket 27 carried by wall 25, as clearly illustrated in Fig. 1. The film 20 is unwound from the roll 26, passed over an idler roller 28, Fig. 1, then through a tensioning device, generally indicated by the numeral 29, and later more fully described. From the tensioning device 29, the strip is fed, emulsion side down, along the track 23 with the bottom of the picture facing away from the operator or toward the wall 25. The film strip 20 is fed to the right along track 23, Fig. 1, and under knife 30 which is periodically operated to sever individual image areas from the film strip. The severed area is positioned on a mount 31, which is in the form of a sheet of cardboard scored for folding along line 32 and formed with spaced pairs of apertures 33, the apertures of each pair being adapted to be brought into registry when the mount is folded on line 32, as is deemed apparent. The upper face of the mount is adhesively coated so that when the mount is folded on line 32 and heated, the two sections of the mount are connected adhesively with the two stereo transparencies sandwiched therebetween, thus producing a non-popping mount. A non-popping mount results from sealing the transparencies in the mount so they cannot move out of the focus plane. This result is secured by sealing the four edges of the transparency to the cardboard mount.

Before going into a detailed description of the various mechanisms and the controls, it is believed that a brief description of the general operation of the machine will afford a clearer understanding of the relation of the various components.

Figure 1:
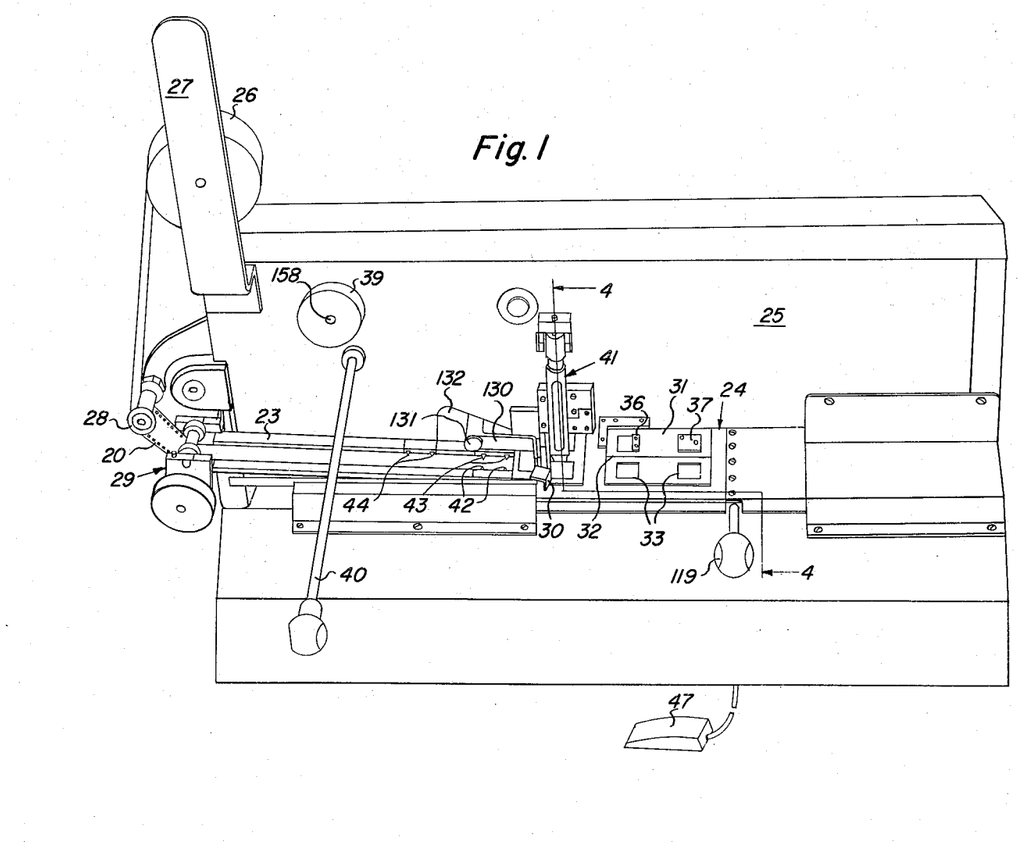
Fig. 1 is a general front elevation view of the entire machine, showing the relation of the various parts.
Figure 5:
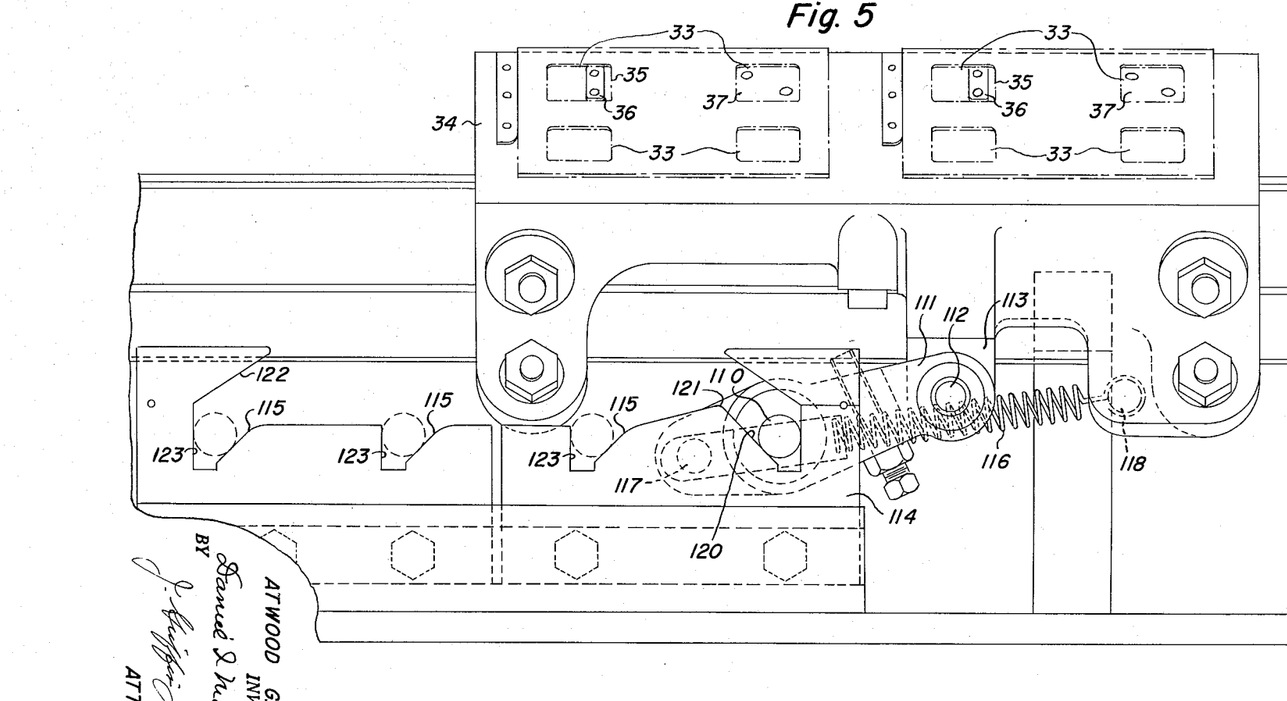
Fig. 5 is a front elevation view of the mount supporting platen and the control mechanism therefor.

A pair of mounts 31 are manually placed on a movable platen 34 so that the upper apertures of the mount receive guide block 36 and 37, as shown in Figs. 1 and 5. These guide blocks serve to position the mounts 31 accurately on the platen 34 and with the lower mount apertures in alignment with the film track 23, and held in place against the platen surface by vacuum, as best shown in Fig. 1. Before threading the film, the film alignment knob 39 is turned counterclockwise, as viewed in Fig. 1, to the limit of its stop, and the film advance knob 40, Fig. 1, is placed in the extreme right position. The platen 34 is positioned so that the left lower aperture of either mount is under the tacker, generally indicated by the numeral 41. The film strip is then threaded through the tensioning device 29 along the track 23 until the first image area or frame of a stereo pair is nearly aligned in the lower frame indicators 42 on the track 23. The film aligning knob 39 is then turned clockwise, Fig. 1, to position the first frame in the upper indicators 43, checking to see if the mate of the first frame is positioned in the second set of upper indicators 44. The film advance knob 40 is moved twice from the right stop to the left stop and back, and then the knife 30 is manually actuated by pressing down on the outer end 45 of an arm 46 connected to the knife 30, see Fig. 6. This operation will chop the perforation number on the leading end of the film strip. The film strip is then advanced one more frame by moving the film advance knob 40 to the right, and a foot pedal 47 is pressed to cycle the machine.

Figures 6, 9:
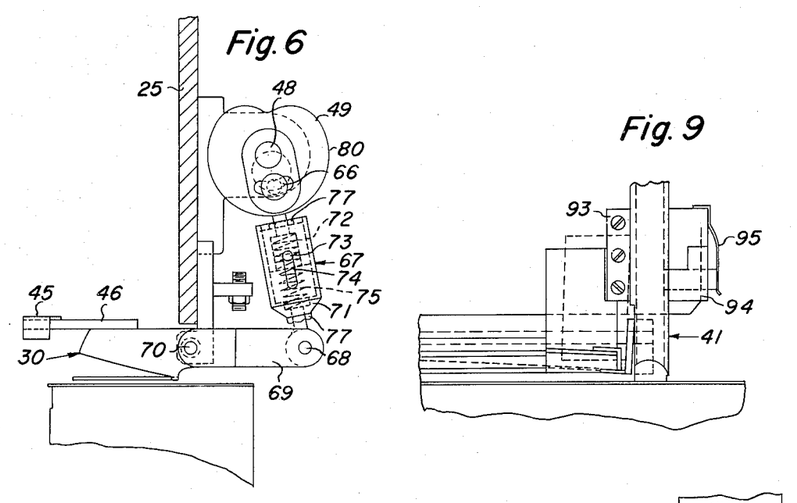
Fig. 6 is a vertical sectional view through the mechanism illustrated in Fig. 2, and taken substantially on line 6—6 thereof, showing the control mechanism for the knife.
Fig. 9 is a front elevation view of the tacker and knife.

A one-revolution electric drive turns the cam shaft 48 rotating a cam 49, see Fig. 6, which actuates the film chopping knife 30 and the tacking arm 41. At the completion of the cycle, one stereo frame 1R, Figs. 10 and 11, has been severed from the film strip, positioned over and then heat tacked to the lower left hand aperture 33 of the mount 31 located on the left hand side of the platen. The platen is then moved to the extreme left hand position. The next frame, 21, is then advanced by the advance claw and hand chopped from the film roll. The platen is then moved one position to the right and film frame 2R advanced for mounting simultaneously. The chop knife and tacking iron are operated by a foot switch 47 which actuates the drive mechanism and the film is automatically mounted to the cardboard mount. From hereon, the film is advanced one frame and the platen moves one station for each frame that is mounted, inserting new empty mounts 31 when a pair of stereo images has been mounted. Because of the design of the cam control, to be later described, the platen is first moved from position A, Fig. 11, to the extreme left position B, and then to position C, as will be later more fully described.

Due to the spacing of the lenses of a stereo camera, the right and left hand frames of a stereo pair are not consecutive or adjacent on the film strip, but are displaced by two frames, see Fig. 10. To fully utilize the film, the two intermediate frames are used for two other stereo mates, thus producing the illustrated frame sequence. This sequence complicates mounting, making it necessary to use the platen 34 which holds a pair of mounts in alignment, and moves the mounts in a definite sequence so that the proper pair of image areas is mounted in proper relation on the proper mount.

Figure 11:
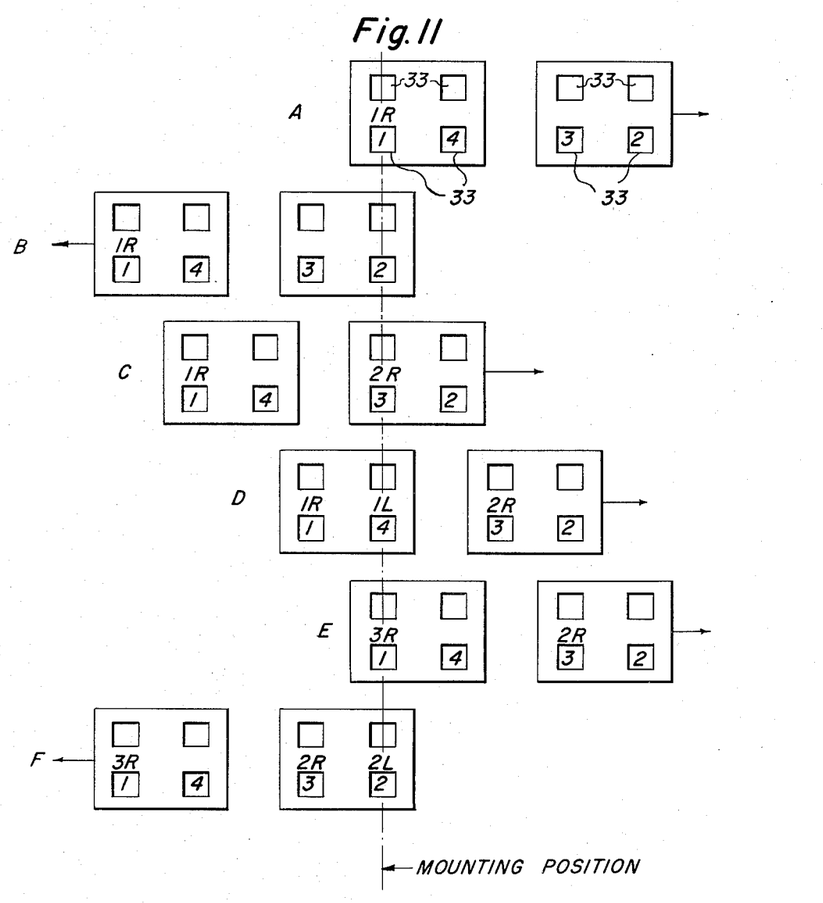
Fig. 11 is a view showing the various positions of the platen and the mounts during a sequence of the mounting operations.

Fig. 11 shows the location of the film receiving apertures 33 in the two mounts 31 positioned on the platen 34. The left hand aperture 33 of the left hand mount contains the numeral "1" indicating the #1 position of the platen, while the right hand aperture 33 of the left mount contains the numeral "4," indicating the #4 position of the platen. Similarly the left and right apertures of the right mount contain the numerals "3" and "2," indicating the #3 and #2 positions respectively of the platen. The mounting may be started with the mounts in either the position shown in Fig. 11A, position #1 of the platen, and with the left hand aperture of the left mount in alignment with the "mounting position," or the position shown in Fig. 11C, position #3 of the platen, with the left hand aperture of the right mount in alignment with the "mounting position." When frame 1R, as shown in the film strip, Fig. 11A, is mounted at station 1, the platen 34 is then moved to station 2, see Fig. 11B, and the blank frame 21 is chopped out. The platen 34 is then moved to the right to station 3 and frame 2R is mounted, see Fig. 11C, and the platen is then moved to the right to station 4 to mount the frame 1L, see Fig. 11D. The first stereo pair has been tacked to one of the mounts. The platen is now moved to station 1 and the mount having the pair of images mounted thereon is removed. Another empty mount is placed on the platen, and the platen moved to mount frame 3R, Fig. 11E. This requirement is followed through the rest of the film, as is apparent from Fig. 11.

The cam shaft 48 operates on a single revolution cycle. This is accomplished by connecting the cam shaft to the output end of an electric gear motor 60 by two spur gears 61 having a 1 to 1 ratio. The single revolution cycle is controlled by a switch cam 62, Fig. 3, on the cam shaft 48 which is positioned to hold the microswitch 63 in a normal closed position for approximately 310° of rotation, as is deemed apparent from an inspection of Fig. 3. The balance of periphery 64 of cam 63 is a drop-off area which allows the microswitch 63, in the motor circuit, to move to an open position to shut off the motor 60. The position of the cam 62, with reference to the microswitch 63, may be adjusted to allow for a minimum off. This adjustment may be made by loosening the locking means, not shown, for the cam and then rotating the latter on the cam shaft 48 and again tightening the locking means. As the locking means may be of a variety of forms, and does not constitute a part of the present invention, details thereof are not shown.

Figures 2, 3:
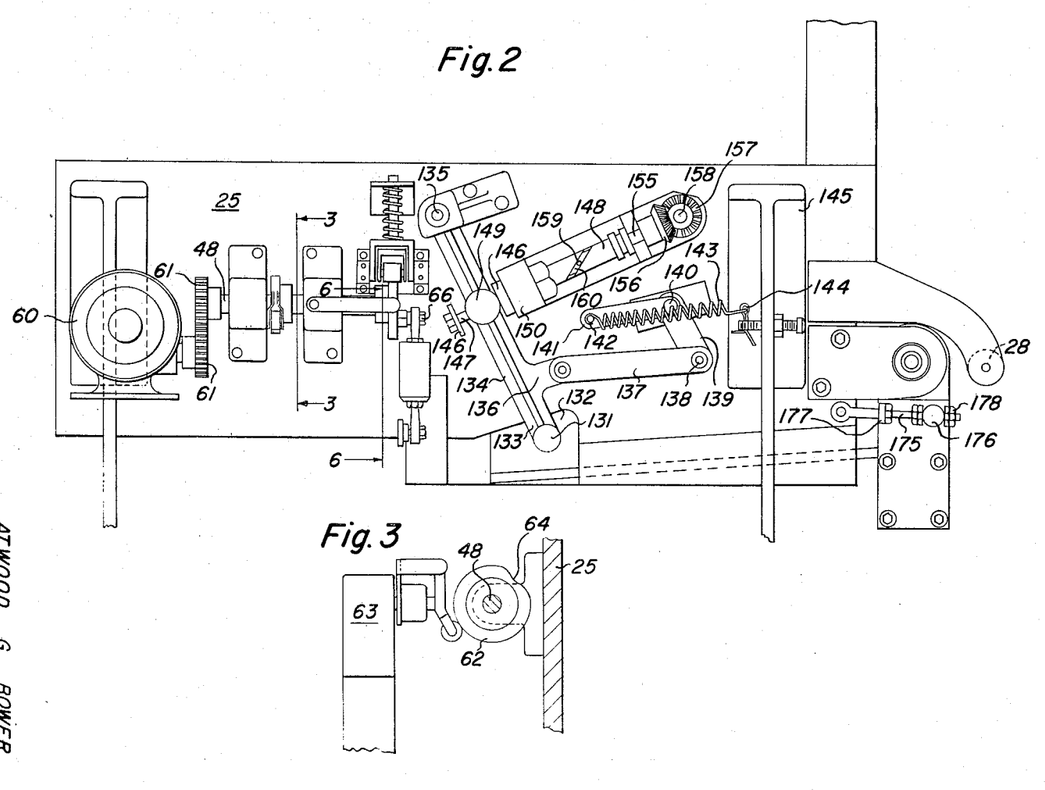
Fig. 2 is a rear elevation view of the machine illustrated in Fig. 1, showing the various control and operating mechanisms.
Fig. 3 is a vertical sectional view taken substantially on line 3—3 of Fig. 2 showing the relation of the control cam and microswitches for the cam shaft and drive motor.

The cutting and tacking cam 49 is carried on the right end of cam shaft 48, as shown in Fig. 2, and performs the double function of controlling the stroke of the cutting knife 30 and the stroke of the tacker 41. A pin 66 tapped into the side of cam 48, eccentric to the center line of the cam shaft 48, see Fig. 6, is used to transmit movement to the cutting knife 30 through an adjustable linkage, broadly designated by the numeral 67, the lower end of which is pivotally connected at 68 to an arm 69 rockably connected at 70 to the plate or wall 25, see Fig. 6. The left or front end of arm 69 carries the knife 30. The linkage 67 forms a connecting member between the pin 66 and the knife 30 when operated by cam 65. However, the linkage 67 is so constructed to permit manual operation of the knife 30 independent of the cams 63 by means of arm 46.

To secure this result, the linkage 67 comprises a pair of telescoping sleeves 71 and 72, the former being connected to arm 69 while the latter is connected to cam 49 as illustrated in Fig. 6. The inner sleeve 72 carries a pin 73 which rides in a slot 74 in sleeve 71. Now, when the cam rotates, the inner sleeve moves up to bring pin 73 into engagement with the upper end of slot 74 to lift sleeve 72 to rock arm 69 counterclockwise to lower the knife 30. A coil spring 76 is positioned between the two sleeves. Now, when knife 30 is lowered manually by means of lever 46, the arm 69 will lift sleeve 71 upward relatively to sleeve 72 and the slot will slide upward relative to the pin 73. Such upward movement will compress spring 76 so that upon release of knife 30, the spring will again move the parts to the normal position shown in Fig. 6. The knife stroke may be adjusted by turning the sleeves 71 and 72 relative to their supporting stub-shafts, and locking the adjusted sleeves by means of locking nuts 77.

The outer edge 80 of cam 49 is used to transmit motion to the tacking iron 41 through a pivoted arm 81 which is connected at its mid-point 82 to wall 25. The arm 81 has pivoted thereon near the right end, Fig. 4, a cantilever link 83 which carries a roller 84 which rides on the surface 80 of the cam 49. The roller is connected to a yoke 85 through which pin 86 extends upward and through a bracket 87 projecting from the rear face of wall 25, as clearly illustrated in Fig. 4. A coil spring 88 is interposed between yoke 85 and bracket 87. The front or left end of arm 81, Fig. 4, is pivotally connected at 89 to the tacker 41. The result is that when the cam 49 is rotated, the arm 81 will be rocked counterclockwise about pivot 82 to lower tacker 41, while the spring 88 serves to rock the arm 81 clockwise to raise the tacker. The pivoted arm 81 is equipped with an override feature that is adjustable for proper tensioning when the tacker 41 is in contact with the severed film positioned on the mount, to allow the cam 49 to continue its cycle without damage to the film and mount. To secure this result, the roller carrying the lever arm 83 extends to the left of roller 84 and is engaged by a spring and screw arrangement 90 and 91 carried by arm 81. By adjusting screw 90, the tension of spring 91 on arm 83 may be varied. Too light a tension causes the tacker to supply insufficient pressure to the film and mount and results in a poor tacking job and the film will not adhere to the mount. Too much tension, however, will cause the tacker iron to emboss the film and mount. This may cause the film frames to twist as they are tacked.

The tacker 41 is held in position and guided by two graphite impregnated synthane gibs or guide bearings 93 and 94. One gib 93 is fixed and gib 94 is held in position by spring 95 to insure freedom of motion when the tacker expands due to the heating element which it contains. Such a heating element may be of standard or suitable construction and does not, per se, form a part of the present invention and is not illustrated or described. To insure alignment of the tacker stroke, pilot guide pin 96 extends upward from the tacker adjacent screw cap 97 and is guided through a bearing guide block 98 located on the front of the machine face plate or wall 25. The tacker iron 41 must be so positioned that the blade 99 thereof contacts the film frame between the perforations and the rear edge of the film, as illustrated in Fig. 4. This position is critical as misalignment of the tacker either over the perforations or rear edge of the film will result in the tacker picking up adhesive from the stereo mount and require too frequent cleaning. This coating of adhesive on the tacker blade would also cause subsequent film frames to stick to the tacker and be pulled free of the mount, or twist the film as the tacker begins its return stroke after tacking. By turning the cap screw 97, the blade 99 may be lowered relative to the film.

The platen 34 is an aluminum casting the top surface of which contains machined grooves, not shown, over which is fitted a 1/32" thick stainless steel plate 104 perforated to allow application of vacuum for holding the stereo mounts 31 in place on the platen as shown in Figs. 1, 4 and 5. As mentioned above, the mounts 31 are placed manually on the platen over the guide blocks 36 and 37 to position the mount accurately on the platen with the lower mount apertures 33 in alignment with the film track and the film strip. The platen is mounted for longitudinal movement along a stationary track member 105 by means of three ball bearings suspended along its front and rear edge. Two horizontal aligned bearings 106 ride on the rail 107 formed on the upper surface of track 105, while a lower inclined bearing 108 rides on the inclined rails 109 formed on the lower side of track 105, as clearly illustrated in Fig. 4.

The platen 34 moves through a sequence of positions. This sequence is maintained by a cam follower 110 which is carried on arm 111 pivoted at 112 to a bracket 113 depending from the movable platen. The follower 110 cooperates with a preset cam assembly 114 mounted on a base plate 22, all as shown in Fig. 5. The cam follower 110 is held in positive contact with one of the cams 115 of the assembly 114, through its four positions as the plate moves from left to right, by means of the toggle spring 116, one end of which is connected at 117 to an arm 111 to the left of follower 110, Fig. 5, while the other end 118 is connected to the platen. When the latter reaches its extreme rightward position, the follower 110 is in engagement with the right cam 115, Fig. 5. The platen is moved by means of a platen advance knob 119 which is suitably connected to the platen 34 for movement therewith. When a cycle has been completed and the follower 110 is in the right cam 115, and the leftward force is applied to the platen advance knob 119, the follower 110 will ride to the left up an inclined side 120 of the right cam 115 until it reaches the apex 121 thereof. When the apex 121 has been reached, the arm 111 has been moved beyond its dead center and is then further moved by toggle spring 116, lifting the cam 110 out of contact with the cam assembly 114. The platen 34 and the cam follower 110 may then be moved freely to the left as viewed in Fig. 5. At the end of this leftward movement, the follower 110 finally engages a downward inclined cam 122 on the assembly to cam the follower 110 into engagement with the left cam 115 to bring the platen back to its starting or initial position and into cooperating relation with the cam assembly 114, all as is deemed apparent from an inspection of Fig. 5.

In moving the platen 34 to the right by means of knob 119, the platen is moved one step at a time, the follower 110 moving from position 2 (left hand position in left cam 115, Fig. 11B) to position 3, Fig. 11C, then position 4, Fig. 11D, and finally to the right position, position 1 (right cam 115), Fig. 11A or 11E. Then the knob 119 is again moved to the left to cam the follower 110 out of engagement with the assembly 114 and return the follower to position 2, as mentioned above. The normal starting sequence position for mounting is in position 1 or 3, number 1 position being the extreme right position, Fig. 5, and number 3 position the second position from the left. In either of these two positions, position A or C, Fig. 11, the right hand picture of a pair is always mounted. When moving the platen from position 3 to position 4, and 4 to 1, etc. it is impossible to move in the wrong direction by reason of the vertical shoulders 123 at the left of each cam 115, but a position may be by-passed by improper operation or jerky operation of the platen. However, when a smooth even pressure is maintained in moving the platen, no difficulty is encountered.

With reference to Figs. 10 and 11, a brief description of the mounting sequence will now be given. The platen is moved to the extreme right position (position A, Fig. 11). In this position the lower left hand aperture of the left mount will now be under the tacker 41. Now, when the knife 30 is actuated the right image 1R is severed and tacked over the left lower aperture of the left mount, as shown in Fig. 11A. The platen is moved to the extreme left, Fig. 11B, and the blank 21 is removed by manually operating the knife 30, as above described. The platen is moved one step to the right, as shown in Fig. 11C. In this position the left aperture of the right mount is now in position to receive the frame 2R. The platen is then moved the next step, to the right, Fig. 11D, and the image 1L is positioned in the right aperture of the left mount. This mount is now completed, and the platen is again moved to the right one more step, Fig. 11E, which is the same as position Fig. 11A. The completed mount is removed and replaced with an empty mount, and frame 3R is then mounted over the left hand aperture of the left mount. The platen is again moved to the extreme left and frame 2L is mounted over the right aperture of the right mount. The platen is then moved one step to the right and the mount containing frames 2R and 2L is then removed and replaced with a new mount. Thus one cycle is completed. From here on the platen is moved step by step in a straight line to mount the successive image areas on the proper mount and in proper alignment and stereo relation It will be apparent from the above description that the platen 34 is always moved in an "in-line" relation and with the frame receiving aperture of the mounts always in direct alignment with the film track 23 and the film strip 20. Also, the platen is moved one step at a time moving from left to right and is then moved back to the left in one step. The proper sequence of movement requires no particular attention on the part of the operator, and affords a straight line simple movement to the platen, thus eliminating complicated moving patterns or mechanisms, the advantages of which are deemed apparent. Thus, the proper pair of stereo images are mounted in proper relation on their respective mounts.

The film strip 20 is advanced through film track 23 by means of a claw, not illustrated, which engages the film perforations in a parallel and opposite alignment. As such claws are well known, details thereof are not deemed necessary. This claw is secured to the right end of a cantilever 130 the left end of which is connected to a stud or shaft 131 which extends through a registering opening 132 in the wall 25. Springs, not shown, mounted in the track 23 exert pressure on one side edge of the film strip, holding the opposite side against track 23 to maintain constant alignment of the film as it moves out over the mount for cutting and tacking. The claw engages in the film perforations during the rightward movement of the arm 130, Fig. 1, advances the film; but, on the return or leftward movement of the arm 130, the claw slides over the perforations. The rear end of the shaft 131 is connected to the lower end 133 of a rockable lever 134, the upper end 135 of which is pivotally mounted on the rear face wall 25, as shown in Fig. 2. Just above the lower end 133, the lever 134 is formed with an ear or lug 136 to which is pivotally connected one end of an arm 137 the other end of which is connected at 138 to one end of an arm 139 of a bellcrank connected at 140 to the film advance knob 40. The other arm 141 of the bellcrank has connected thereto one end 142 of a coil spring 143, the other end 144 of which is anchored to a bracket 145 projecting from the rear face of wall 25.

Now, when the film advance knob 40 is moved to the left, as viewed in Fig. 1, the shaft 140 connected thereto is rotated clockwise, as shown in Fig. 2 but as viewed from Fig. 1, to rock the bellcrank clockwise to move the arm 137 to the left. Such movement rocks lever 134 clockwise, Fig. 2, about pivot 135 to move arm 130, carrying the claw to the left, as viewed in Fig. 1. To advance the film strip the distance of one image area the knob 40 must be moved to the right as viewed in Fig. 1. Positive forward and backward movement is aided by the toggle spring 143. The stroke of the claw is controlled by a pair of spaced stops 146 axially spaced on a reduced portion 147 of a hollow shaft 148, the portion 147 extending through a boss 149 carried on lever 134. The shaft 148 is supported in a pair of spaced bearings 150 positioned on the rear face of wall 25. In order that the positioned stops 146 may be adjusted, the lower end of shaft 148 in the lower bearing, Fig. 2, is threaded and engages a similarly threaded portion in said lower bearing so that rotation of the shaft 148 in a manner to be presently described, will serve to move the latter, and hence the stops 146, axially and relative to boss 149 to adjust the claw stroke. In the present instance the claw is adjusted for a 5-perforation advance.

A second shaft 155 is rotatably positioned inside the hollow shaft 148 and its upper or right end, Fig. 2, is connected to a bevel gear 156 which, in turn, is connected to a bevel gear 157 carried by a shaft 158 to which the film aligning knob 39 is connected. By means of this arrangement, rotation of knob 39 will serve to rotate shaft 155. The latter is formed with a radially extending pin 159 which extends through a registering helical or suitably shaped slot 160 in the outer hollow shaft 148. The result is that rotation of shart 155 by means of control knob 39 will also rotate shaft 148. The latter, by means of its threaded connection with the lower bearing, will move axially to move or position the stops 146, all of which is deemed apparent from an inspection of Fig. 2.

Figures 7, 8:
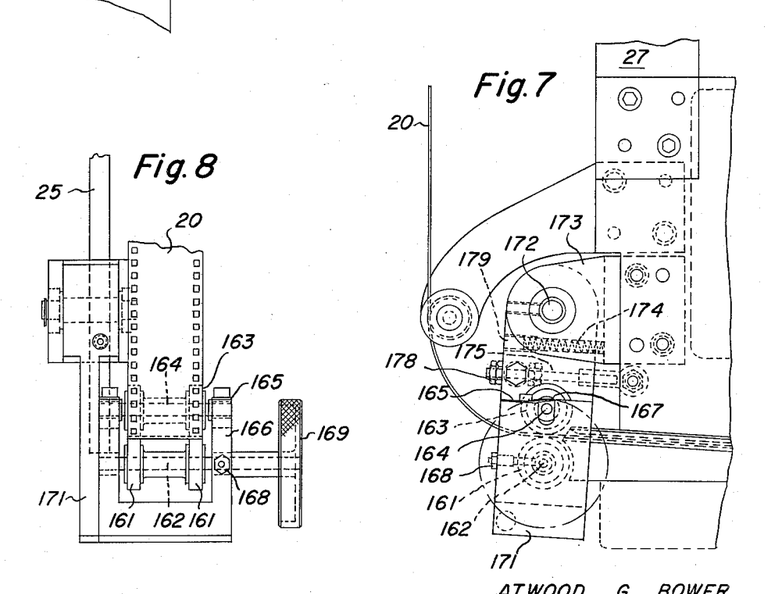
Fig. 7 is a partial front elevation view of the left end of the machine illustrated in Fig. 1, showing the details of the film strip tensioning mechanism.
Fig. 8 is a left end view of the mechanism illustrated in Fig. 7.

The film is initially advanced through the film track by means of a pair of manually operated pinch rollers carried by the tensioning device 29, see Figs. 1, 7 and 8. The pinch roll assembly consists of two bottom rolls 161 mounted on and pinned to a shaft 162 and a pair of upper pinch rollers 163 mounted on and pinned to a floating shaft 164. The top rollers 163 are held in contact with the bottom rollers 161 by means of spring clips 165 carried by a U-shaped bracket 166 pressing on the outboard ends 165 of shaft 164, see Fig. 8. The lower rollers 161 have an adjustment screw 168 that controls the amount of friction applied to shaft 162. This adjustment is necessary to dampen movement of shaft 162 so that the inertia developed by knob 169, connected to shaft 162, will not cause the film strip to carry through at the end of the claw advance. To initially move the film, the knob 169 is rotated manually to rotate the shaft 162 and the lower rollers 161. The film strip 20, which is positioned between the rollers 161 and 162, is held against rollers 161 by the spring clips 165, so that rotation of the knob 169 will advance the film strip to the right, as viewed in Fig. 1, and toward the film advance claw mechanism above described.

The bracket 166 carrying the pinch roll assembly 29 is secured to the lower end of a depending arm 171, the upper end of which is rockably mounted at 172 on a bracket 173 carried by wall 25. A coil spring 174 positioned on arm 171 and engaging the wall 25 tends to move or rock arm 171 clockwise about its pivot 172, as viewed in Fig. 7, to move the pinch roller assembly to the left for a purpose to be presently described. The tension of the rollers 161 and 163 is such that they pinch the film strip and are rotated during a portion of each film movement by the claw. This pinching serves initially to rock the entire assembly 29 counterclockwise about pivot 172 until brought to a stop. Further movement of the film by the claw thus serves to rotate the rollers 161 and 163. In order to limit movement of the assembly, the wall 25 has projecting therefrom a rod 175 which extends through a boss 176 on arm 171. This rod 175 is provided with a forward stop 177, which is engaged by the boss 176 limiting the forward movement of the assembly during the film feeding operation. During this forward movement, the rocking of the arm of the assembly compresses spring 174 to tension the latter. However, after the film movement has been completed by the claw, the tension of spring 174 tends to rock the assembly clockwise about pivot 172, Fig. 7. This tendency to rock imparts a rearward pull or force on the film strip and serves to tension the strip to retain the latter in proper relation and engagement with the film moving claw, the advantages of which are deemed apparent to those familiar with such film moving means. A second stop 178 on rod 175 is engaged by boss 176 to limit the leftward movement of the assembly to retain the latter in proper relation to the film track.

The above-described tensioning action of the film strip is necessary in order to maintain tolerance of the film frame as it is cut from the film strip. Care must be used so that the tensions are not adjusted too high as this will cause the film perforations to be torn when the film is advanced, the disadvantages of which are deemed apparent. The tension of the travel spring 174 is adjusted when the machine is made. To compensate for wear of the parts, adjustment of the spring tension can be made by adjusting screw 179. The pinch roll travel is adjusted by means of stop 177 so the advancing claw engages the fifth perforation and allows a 5-perforation advance.

It is thus apparent from the above description that the present invention provides a "in-line" machine for mounting pairs of stereo transparencies in proper spaced aligned and stereo relation on mounts from a film strip in which the image areas of a pair are spaced along the strip.

The platen on which the mounts are moved in a definite relation, moves the mounts in a specific sequence of movement and with the film receiving apertures always in alignment with the film strip. The film severing and tacking mechanisms are actuated in proper relation to the platen movement, so that the mount is in proper position to receive the correct image area. The film strip is tensioned or held in a taut relation by means of the tensioning device 29 to insure proper positioning of the image area to be severed and tacked. The machine is simple in construction, easy to operate, accurate and highly effective in use.

While one embodiment of the invention has been disclosed, it is to be understood the inventive idea may be carried out in a number of ways. Therefore, the present invention is not to be limited except as necessitated by the prior art and the scope of the appended claims.

What I claim and desire to secure by Letters Patent of the United States is:

1. In a device for mounting pairs of stereo transparencies, the combination with a film strip in which the image areas of each pair are displaced along the strip, means for feeding the strip the distance of one image area at a time, means to sever successively single image areas from said strip, a stero mount formed with a pair of aligned spaced apertures, of a support for said mount, and means for moving said support relative to said strip to position the image areas of a pair on said mount and over said apertures in proper aligned and stero relation.

2. In a device for mounting pairs of stero transparencies, the combination with a film strip in which the image areas of each pair are displaced along the strip, means for feeding the strip the distance of one image area at a time, means to sever successively single image areas from said strip, a stero mount formed with a pair of aligned spaced apertures, of a support for said mount, and means for moving said support relative to and in alignment with said strip to receive the image areas of a pair on said mount and over said apertures in proper aligned and stereo relation.

3. In a device for mounting pairs of stero transparencies, the combination with a film strip in which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, and means for moving said support relative to said strip to position the pairs of image areas on the respective mounts and over the apertures thereof in proper aligned and stereo relation.

4. In a device for mounting pairs of stereo transparencies, the combination with a film strip in which the image areas of each pair are displaced along the strip, means for feeding the strip the distance of one image area at a time, means to sever successively single image areas from said strip, of a pair of stereo mounts arranged in aligned relation on said support, each mount being formed with a pair of aligned spaced apertures, and means to move said support in a straight line relation to said strip to position the successively severed image areas of each pair on the proper mount and in aligned stereo relation thereon and over the apertures thereof.

5. In a device for mounting pairs of stereo transparencies, the combination with a film strip in which the image areas of each pair are displaced along the strip, means for feeding the strip the distance of one image area at a time, means to sever successively single image areas from said strip, a stereo mount formed with a pair of aligned spaced apertures, of a support for said mount, means for moving said support relative to said strip to position the image areas of a pair on said mount and over said apertures in proper aligned and stereo relation, and means to reduce the pairs of images in proper relation over the apertures of said mount.

6. In a device for mounting pairs of stereo transparencies, the combination with a film strip in which the image areas of each pair are displaced along the strip, means for feeding the strip the distance of one image area at a time, means to sever successively single image areas from said strip, a stereo mount formed with a pair of aligned spaced apertures, of a support for said mount, means for moving said support relative to said strip to position the image areas of a pair on said mount and over said apertures in proper aligned and stereo relation, means to secure the pairs of images in proper relation over the apertures of said mount, and means to operate said severing means and said securing means in a timed relation.

7. In a device for mounting pairs of stereo transparencies, the combination with a film strip in which the image areas of each pair are displaced along the strip, means for feeding the strip the distance of one image area at a time, means to sever successively single image areas from said strip, a stereo mount formed with a pair of aligned spaced apertures, of a support for said mount, means to position said mount accurately on said support relative to said strip, and means for moving said support relative to said strip to position the image areas of a pair on said mount and over said apertures in proper aligned and stereo relation.

8. In a device for mounting pairs of stereo transparencies, the combination with a film strip in which the image areas of each pair are displaced along the strip, means for feeding the strip the distance of one image area at a time, means to sever successively single image areas from said strip, a stereo mount formed with a pair of aligned spaced apertures, of a support for said mount, means to move said support in a straight line and with said apertures in alignment with said strip, and means for controlling the movement of said support in a definite sequence to cause a pair of images to be positioned over said apertures in proper aligned and stereo relation.

9. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, and means for controlling the movement of said support in a definite sequence so that a pair of stereo images will be positioned on each mount in proper aligned and stereo relation.

10. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, means for controlling the movement of said support in a definite sequence so that a pair of stereo images will be positioned on each mount in proper aligned and stereo relation, said means comprising a stationary cam plate and a cam follower carried by and movable with said support and engaging said plate.

11. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, means for controlling the movement of said support in a definite sequence so that a pair of stereo images will be positioned on each mount in proper aligned and stereo relation, said control means comprising a fixed plate, a plurality of aligned cams formed in said plate, a movable cam follower carried by and movable with said support, means to hold said follower in positive engagement with said plate to cause said follower to engage said cams in a definite cycle of operation to position the apertures of said mounts successively under the severed image areas so that each pair of stereo images will be positioned on a mount and over the apertures thereof in proper aligned and stereo relation.

12. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, means for controlling the movement of said support in a definite sequence so that a pair of stereo images will be positioned on each mount in proper aligned and stereo relation, said control means comprising a fixed plate, a plurality of aligned cams formed on said plate, a movable cam follower carried by and movable with said support, means to hold said follower in positive engagement with said plate to cause said follower to engage said cams in a definite cycle of operation to position the apertures of said mounts successively under the severed image areas so that each pair of stereo images will be positioned on a mount and over the apertures thereof in proper aligned and stereo relation, and means on the end of said plate for lifting the follower out of operative relation with said cams at the end of a cycle of movement to permit said follower to be moved to the other end of said plate to start another cycle.

13. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, means for controlling the movement of said support in a definite sequence so that a pair of stereo images will be positioned on each mount in proper aligned and stereo relation, said control means comprising a fixed plate, a plurality of aligned cams formed on said plate, a movable cam follower carried by and movable with said supports, means to hold said follower in positive engagement with said plate to cause said follower to engage said cams in a definite cycle of operation to position the apertures of said mounts successively under the severed image areas to that each pair of stereo images will be positioned on a mount and over the apertures thereof in proper aligned and stereo relation, means on the end of said plate for lifting the follower out of operative relation with said cams at the end of a cycle of movement to permit said follower to be moved to the other end of said plate to start another cycle, and means at the other end of said plate for moving said follower into operative relation with said cams at the start of a cycle.

14. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, means for controlling the movement of said support in a definite sequence so that a pair of stereo images will be positioned on each mount in proper aligned and stereo relation, said control means comprising a fixed plate, a plurality of aligned cams formed on said plate, a movable cam follower carried by and movable with said support, means to hold said follower in positive engagement with said plate to cause said follower to engage said cams in a definite cycle of operation to position the apertures of said mounts successively under the servered image areas so that each pair of stereo images will be positioned on a mount and over the apertures thereof in proper aligned and stereo relation, means on the end of said plate for lifting the follower out of operative relation with said cams at the end of a cycle of movment to permit said follower to be moved to the other end of said plate to start another cycle, and means to retain said follower out of operative relation with said plate when moving from said one end to said other end, and cam means at said other end engaging said follower to move the latter automatically into engagement with said plate at the start of a cycle.

15. In a device for mounting pairs of stereo transparencies, the combination with a film strip on which the image areas of each pair are displaced along the strip, means for feeding the strip the distance of one image area at a time, means to sever successively single image areas from said strip, a pair of stereo mounts each of which is formed with a pair of aligned spaced apertures, of a support for said mounts, means on said support for positioning the pair of mounts thereon with the apertures thereof in alignment with the film strip, means to move said support in a straight line relation relative to strip and with said apertures in alignment therewith, means for controlling the movement of said support in a definite sequence so that a pair of stereo images will be positioned on each mount in proper aligned and stereo relation, said control means comprising a fixed plate, a movable cam follower carried by and movable with said support, means to hold said follower in positive engagement with said plate to cause said follower to engage said cams in a definite cycle of operation to position the apertures of said said mounts successively under the severed image areas so that each pair of stereo images will be positioned on a mount and over the apertures thereof in proper aligned and stereo relation, and means on said plate for limiting the direction of movement of said support during said cycle.

16. In a device for mounting pairs of stereo transparencies, the combination with a film strip on which the image areas of each pair are displaced along the strip, means for feeding the strip the distance of one image area at a time, means to sever successively single image areas from said strip, a stereo mount formed with a pair of aligned spaced apertures of a support for said mount, of means engaging said film strip and cooperating with said feeding means to draw the strip tight between said feeding means and said engaging means to position an image area in proper relation with said severing means, and means for moving said support relative to said strip to position the image areas of a pair on said mount and over said apertures in proper aligned and stereo relation.

17. In a device for mounting pairs of stereo transparencies, the combination with a film strip on which the image areas of each pair are displaced along the strip, means for feeding the strip the distance of one image area at a time, means to sever successively single image areas from said strip, a stereo mount formed with a pair of aligned spaced apertures, of a support for said mount, means including a pair of pivot rollers engaging said film and rotated thereby, a pivoted arm carrying said rollers, the feeding of said film causing said rollers to grip said film and move in the direction of film feed, means for limiting the movement of said rollers in said direction, said rollers being then rotated by said moving film, means for rocking said arm at the end of the film feeding to move said rollers in the opposite direction to draw the film taut between said feeding means and said rollers to position an image area in proper relation to said severing means, and means for moving said support relative to said strip to position the image areas of a pair on said mount and over said apertures in proper aligned and stereo relation.

References Cited in the file of this patent

UNITED STATES PATENTS

| | | |
|---|---|---|
| 1,251,081 | Meyer | Dec. 25, 1917 |
| 1,400,827 | Leumann | Dec. 20, 1921 |
| 2,092,177 | McClay | Sept. 7, 1937 |
| 2,555,218 | Barley | May 29, 1951 |
| 2,558,087 | Connor et al. | Mar. 4, 1952 |
| 2,643,786 | Baker | June 30, 1953 |
| 2,666,543 | Standish | Jan. 19, 1954 |